(12) United States Patent
Nakamoto

(10) Patent No.: US 12,732,715 B2
(45) Date of Patent: Sep. 8, 2026

(54) SCANNING MICROSCOPE, PIXEL GENERATION METHOD, AND STORAGE MEDIUM

(71) Applicant: Evident Corporation, Tatsuno-machi (JP)

(72) Inventor: Chika Nakamoto, Kamiina-gun (JP)

(73) Assignee: Evident Corporation, Tatsuno-machi (JP)

( * ) Notice: Subject to any disclaimer, the term of this patent is extended or adjusted under 35 U.S.C. 154(b) by 0 days.

(21) Appl. No.: 18/890,781

(22) Filed: Sep. 20, 2024

(65) Prior Publication Data

US 2025/0119657 A1 Apr. 10, 2025

(30) Foreign Application Priority Data

Oct. 5, 2023 (JP) ................................ 2023-173347

(51) Int. Cl.
*H04N 25/60* (2023.01)
*G01J 1/44* (2006.01)
*G02B 21/00* (2006.01)

(52) U.S. Cl.
CPC ................ *H04N 25/60* (2023.01); *G01J 1/44* (2013.01); *G02B 21/008* (2013.01); *G01J 2001/4453* (2013.01); *G01J 2001/4466* (2013.01)

(58) Field of Classification Search
CPC ......... H04N 25/60; H04N 25/773; G01J 1/44; G01J 2001/4453; G01J 2001/4466; G02B 21/008; G02B 21/365
See application file for complete search history.

(56) References Cited

U.S. PATENT DOCUMENTS

| | | | | |
|---|---|---|---|---|
| 7,495,236 | B2 | 2/2009 | Widzgowski et al. | |
| 10,798,323 | B1 * | 10/2020 | Mayer | H04N 25/583 |
| 2006/0031029 | A1 * | 2/2006 | Staton | G01N 21/6452 702/32 |
| 2018/0003938 | A1 * | 1/2018 | Nakamoto | G02B 21/0084 |
| 2018/0176342 | A1 * | 6/2018 | Jackson | H04L 69/22 |
| 2019/0081100 | A1 * | 3/2019 | Matsumoto | H10F 39/802 |

FOREIGN PATENT DOCUMENTS

JP 5264064 B2 8/2013

* cited by examiner

*Primary Examiner* — Michael E Teitelbaum
(74) *Attorney, Agent, or Firm* — Holtz, Holtz & Volek PC

(57) ABSTRACT

A scanning microscope includes: a photodetector that detects light from a sample; a sampling circuit that samples an output signal of the photodetector; and a processor. The processor performs an operation including at least integration on a plurality of items of sampling data sampled by the sampling circuit, determines whether a result of the operation is noise or a signal, and generates pixel data based on a result of the operation and a result of the determination.

13 Claims, 8 Drawing Sheets

SCANNING MICROSCOPE, PIXEL GENERATION METHOD, AND STORAGE MEDIUM

CROSS REFERENCE TO RELATED APPLICATIONS

This application is based upon and claims the benefit of priority of the prior Japanese Patent Application No. 2023-173347, filed Oct. 5, 2023, the entire contents of which are incorporated herein by reference.

BACKGROUND OF THE INVENTION

Field of the Invention

The present disclosure relates to a scanning microscope, a pixel generation method, and a storage medium.

Description of the Related Art

Conventionally, there is known a technique for periodically acquiring digital detection signals of a photodetector unit included in a scanning microscope, averaging the digital detection signals, and thereby reducing noise included in the digital detection signals (see, for example, JP 5264064 B2).

SUMMARY OF THE INVENTION

A scanning microscope according to an aspect of the present invention includes: a photodetector that detects light from a sample; a sampling circuit that samples an output signal of the photodetector; and a processor that performs an operation including at least integration on a plurality of items of sampling data sampled by the sampling circuit, determines whether a result of the operation is noise or a signal, and generates pixel data based on a result of the operation and a result of the determination.

A scanning microscope according to another aspect of the present invention includes: a photodetector that detects light from a sample; an integration circuit that integrates an output signal of the photodetector; a sampling circuit that samples an output signal of the integration circuit; and a processor that determines whether sampling data sampled by the sampling circuit is noise or a signal, and generates pixel data based on the sampling data and a result of the determination, and the integration by the integration circuit, the sampling by the sampling circuit, and the determination are performed at a time interval shorter than a pixel period.

A pixel generation method according to an aspect of the present invention includes: performing an operation including at least integration on a plurality of items of sampling data obtained by sampling an output signal of a photodetector; determining whether a result of the operation is noise or a signal; and generating pixel data based on a result of the operation and a result of the determination.

A storage medium according to one aspect of the present invention is a computer-readable storage medium having stored thereon a program for causing a computer to execute processing of: performing an operation including at least integration on a plurality of items of sampling data obtained by sampling an output signal of a photodetector; determining whether a result of the operation is noise or a signal; and generating pixel data based on a result of the operation and a result of the determination.

DESCRIPTION OF THE EMBODIMENTS

The above-described technology (see, for example, JP 5264064 B2) can reduce short period noise (white noise or switching noise) among noise included in a digital detection signal by averaging digital detection signals, yet cannot reduce long period noise or a drift.

Hereinafter, embodiments of the present invention will be described with reference to the drawings.

First Embodiment

Figure 1:
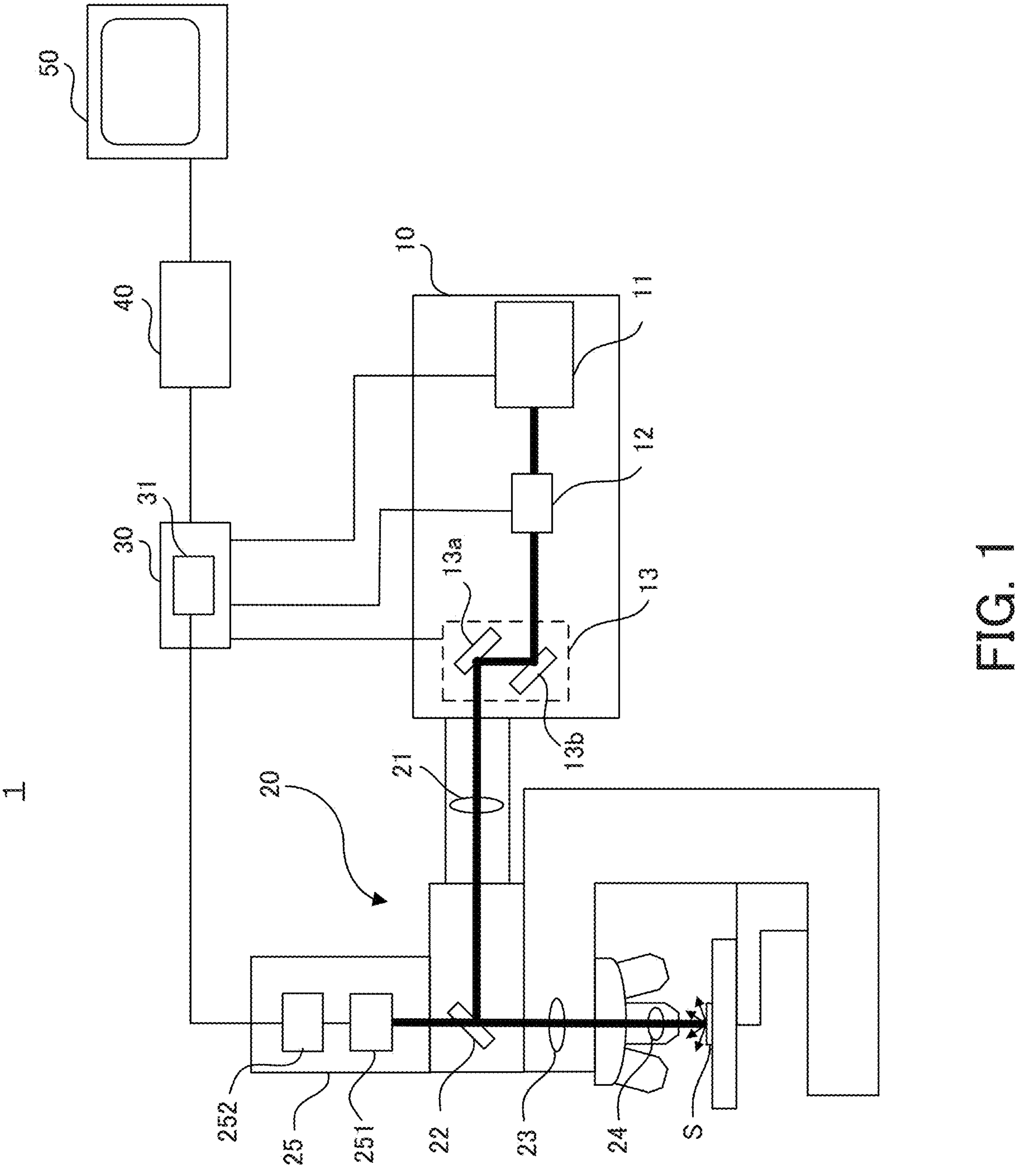
FIG. 1 is a diagram illustrating a configuration of a scanning microscope according to a first embodiment.

FIG. 1 is a diagram illustrating a configuration of a scanning microscope according to the first embodiment.

A scanning microscope 1 illustrated in FIG. 1 includes a laser light source device 10, a microscope body 20, and a control device 30.

The laser light source device 10 includes a laser light source 11, a dimming unit 12, and a scanner 13.

The laser light source 11 emits laser light. The laser light source 11 is a gas laser or a semiconductor laser (LD) that performs CW oscillation (continuous oscillation), a pulsed laser such as a Titanium Sapphire (TiSa) laser that performs pulse oscillation, a high-frequency superimposed Laser Diode (LD), or the like.

The dimming unit 12 adjusts the intensity of the laser light emitted from the laser light source 11 according to an instruction from the control device 30. The dimming unit 12 is an acousto-optic element, a shutter, a dimming filter, or the like. Note that the intensity of the laser light may be adjusted by controlling a driving current of the laser light source 11 by the control device 30. In this case, the dimming unit 12 can be omitted.

The scanner 13 scans the laser light dimmed by the dimming unit 12. The scanner 13 includes, for example, a pair of galvano mirrors **13*a* and 13*b* coated with aluminum, changes the angles of the galvano mirrors 13*a* and 13*b* according to an instruction from the control device 30, and is driven by a raster scan method. Consequently, the laser light from the laser light source 11 can be two-dimensionally scanned on a sample (a specimen) S. The scanner 13** may be such a galvano scanner, a resonant scanner, an acousto-optic deflection element, or the like.

The microscope body 20 includes a lens 21, a dichroic mirror 22, a lens 23, an objective lens 24, and a photodetector 25.

The lenses 21 and 23 relay the laser light from the laser light source device 10 to the objective lens 24. The objective lens 24 irradiates the sample S with the laser light while condensing light (reflected light or fluorescence) from the sample S.

The dichroic mirror 22 reflects the laser light from the laser light source device 10 toward the objective lens 24 while allowing the light from the sample S condensed by the objective lens 24 to transmit therethrough, and thereby splitting an optical path of the laser light and an optical path of the light from the sample S.

The photodetector 25 detects the light having transmitted through the dichroic mirror 22 from the sample S. More specifically, the photodetector 25 includes a photoelectric conversion element 251 and a photodetector circuit 252. The photoelectric conversion element 251 photoelectrically converts the light having transmitted through the dichroic mirror 22 from the sample S, and outputs a current signal corresponding to the luminance of this light. The photoelectric conversion element 251 is a Photo Multiplier Tube (PMT), an Avalanche Photo Diode (APD) array, or the like. The photodetector circuit 252 performs IV conversion (current-voltage conversion) and signal amplification on the output signal of the photoelectric conversion element 251, and outputs the obtained signal (analog electrical signal).

The control device 30 controls the laser light source device 10 and the microscope body 20. Furthermore, the control device 30 includes a processing unit 31 that generates pixel data from the output signal of the photodetector 25, and generates image data of the sample S on the basis of each pixel data generated by the processing unit 31 and a scanning position of the laser light on the sample S corresponding to each pixel data. Details of the processing unit 31 will be described later with reference to FIG. 2.

Furthermore, the control device 30 is connected with a Personal Computer (PC) 40 connected with a monitor 50 such as a liquid crystal display. The PC 40 causes the monitor 50 to display, for example, an image related to the image data of the sample S generated by the control device 30.

Figure 2:
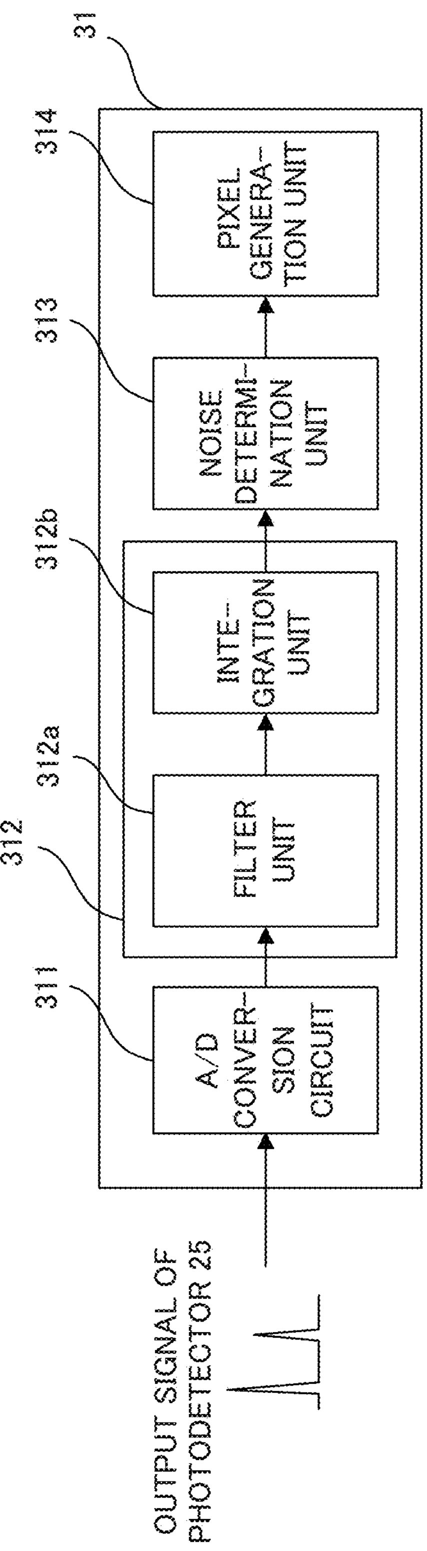
FIG. 2 is a diagram illustrating a configuration of a processing unit according to the first embodiment.

FIG. 2 is a diagram illustrating a configuration of the processing unit according to the first embodiment.

The processing unit 31 illustrated in FIG. 2 includes an A/D conversion circuit 311, an operation unit 312, a noise determination unit 313, and a pixel generation unit 314.

The A/D conversion circuit 311 performs A/D conversion on the output signal (analog electrical signal) of the photodetector 25 in synchronization with a sampling clock to sample. As described above, the A/D conversion circuit 311 is an example of a sampling unit that samples the output signal of the photodetector 25. Hereinafter, the digital electrical signal sampled (A/D converted) by the A/D conversion circuit 311 is referred to as sampling data.

The operation unit 312 performs an operation including at least integration on the plurality of items of sampling data sampled by the A/D conversion circuit 311. More specifically, the operation unit 312 includes at least an integration unit 312*b*, and may further include a filter unit 312*a* as illustrated in FIG. 2. The filter unit 312*a* performs filtering processing such as moving average processing or low-pass filtering processing on the plurality of items of sampling data sampled by the A/D conversion circuit 311. The integration unit 312*b* integrates the plurality of items of sampling data subjected to filter processing by the filter unit 312*a*. Note that, in a case where the operation unit 312 does not include the filter unit 312*a*, the integration unit 312*b* integrates a plurality of items of sampling data sampled by the A/D conversion circuit 311.

The noise determination unit 313 determines whether an operation result of the operation unit 312 (an integration result of the integration unit 312*b*) is noise or a signal. According to this determination, for example, the operation result is determined as noise when the operation result of the operation unit 312 is less than a threshold, and is determined as a signal when the operation result is the threshold or more.

Such an operation by the operation unit 312 and determination by the noise determination unit 313 are performed at a time interval shorter than one pixel period. The one pixel period is a sampling time per pixel constituting an image of the sample S. The time interval shorter than the one pixel period is, for example, a time interval per period when the one pixel period is equally divided into a plurality of periods. Note that a period of a sampling clock of the A/D conversion circuit 311 is naturally a time shorter than the time interval at which the operation by the operation unit 312 and the determination by the noise determination unit 313 are performed.

The pixel generation unit 314 generates pixel data on the basis of the operation result of the operation unit 312 (the integration result of the integration unit 312*b*) and the determination result of the noise determination unit 313. More specifically, the pixel generation unit 314 generates the pixel data of one pixel on the basis of each operation result of the operation unit 312 (each integration result of the integration unit 312*b*) and each determination result of the noise determination unit 313 in one pixel period. At this time, the pixel generation unit 314 invalidates the operation result of the operation unit 312 determined as noise by the noise determination unit 313, validates the operation result of the operation unit 312 determined as the signal by the noise determination unit 313, and integrates only the validated operation results of the operation unit 312, and thereby generates the pixel data. Note that invalidating the operation result of the operation unit 312 also means handling the operation result of the operation unit 312 as 0. Alternatively, the pixel generation unit 314 may generate the pixel data by integrating results obtained by subtracting a value based on a tendency of the invalidated operation result of the operation unit 312 from each validated operation result of the operation unit 312. The value based on the tendency of the invalidated operation result of the operation unit 312 is, for example, an average value of the invalidated operation results of the operation unit 312 in one pixel period.

According to such a configuration of the processing unit 31, the operation unit 312 can reduce the short period noise among noise included in the output signal of the photodetector 25, and the noise determination unit 313 and the pixel generation unit 314 can reduce the long period noise and the drift among noise included in the output signal of the photodetector 25.

Figure 3:
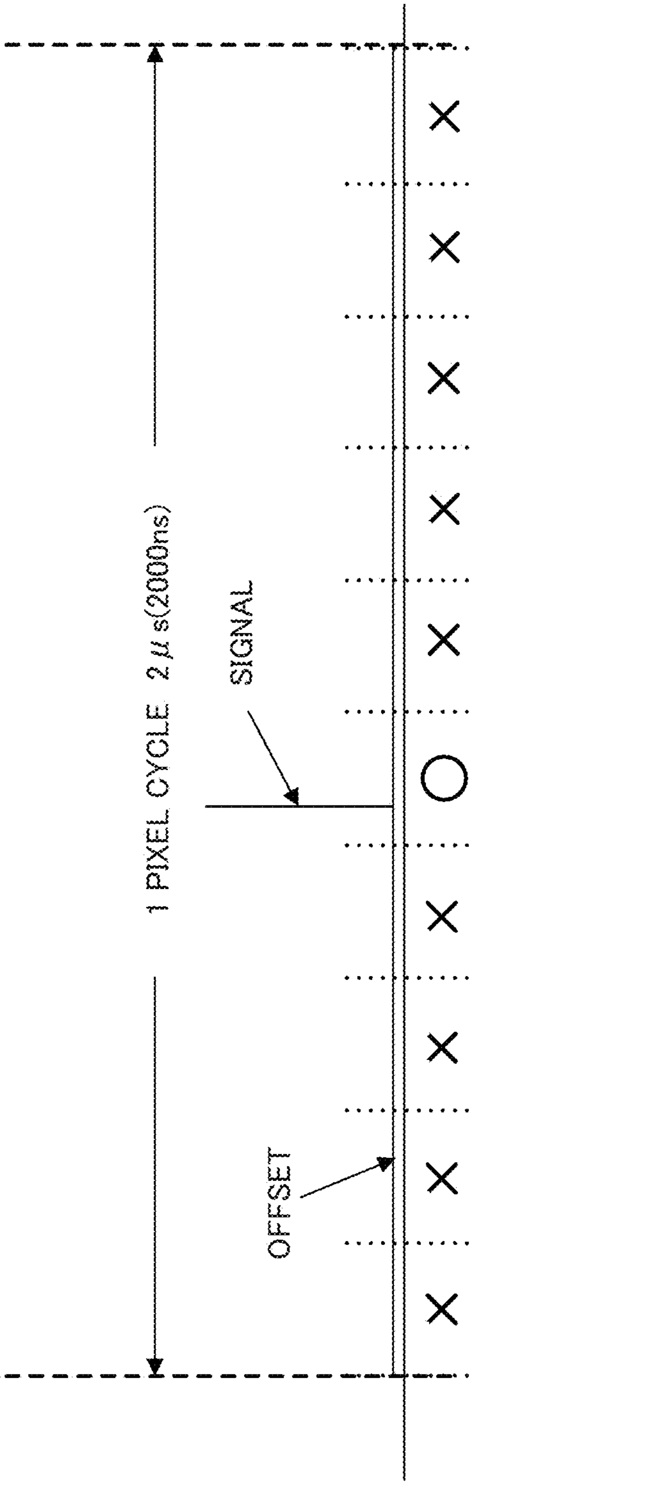
FIG. 3 is a view for describing a specific example of an operation of the processing unit according to the first embodiment.

FIG. 3 is a view for describing a specific example of an operation of the processing unit according to the first embodiment.

This specific example assumes that the output signal of the photodetector 25 illustrated in FIG. 3 is obtained in one pixel period. One pixel period is two μs (2000 ns). One period of the sampling clock of the A/D conversion circuit 311 is one ns. The operation by the operation unit 312 and the determination by the noise determination unit 313 are performed at time intervals (intervals of 200 ns) per one period obtained by equally dividing one pixel period into 10 periods. It is assumed that the operation unit 312 does not include the filter unit 312*a*. It is assumed that the threshold used for determination by the noise determination unit 313 is 220 Least Significant Bits (LSBs). It is assumed that the output signal of the photodetector 25 in one pixel period illustrated in FIG. 3 includes a signal of a photon pulse whose time width is three ns and that corresponds to 500 LSBs, and an offset (drift) that corresponds to one LSB per one ns.

In this case, the operation result of the operation unit 312 (the integration result of the integration unit 312*b*) in a period in which there is no signal of the photon pulse is 200 LSBs and is less than the threshold (220 LSBs), and is thus determined as noise by the noise determination unit 313 (see "x" in FIG. 3). On the other hand, the operation result of the operation unit 312 in the period in which there is the signal of the photon pulse is 697 (500+197) LSBs and is the threshold (220 LSBs) or more, and is thus determined as a signal by the noise determination unit 313 (see "○" in FIG. 3).

Furthermore, the pixel generation unit 314 invalidates the operation result of the operation unit 312 determined as the noise, validates the operation result of the operation unit 312 determined as the signal, integrates only the validated operation results of the operation unit 312, and generates pixel data. In this specific example, since there is only one validated operation result of the operation unit 312, pixel data of 697 LSBs that is this operation result is generated.

Alternatively, the pixel generation unit 314 may generate the pixel data by integrating results obtained by subtracting a value based on the tendency of the invalidated operation result of the operation unit 312 from each validated operation result of the operation unit 312. In this specific example, since only one operation result of the operation unit 312 is validated, pixel data of a result obtained by subtracting a value based on the tendency of the invalidated operation results of the operation unit 312 from 697 LSBs that are this operation result is generated. In a case where, for example, a value based on the tendency of the invalidated operation result of the operation unit 312 is an average value (200 LSBs) of the invalidated operation results of the operation unit 312 in one pixel period, pixel data of 497 (697-200) LSBs is generated.

According to such an operation of the processing unit 31, the pixel data can be generated using only the operation result of the operation unit 312 in the period in which there is the signal of the photon pulse, so that it is possible to reduce an offset included in the pixel data to be generated. In a case where, for example, the pixel data is generated by simply integrating sampling data sampled in one pixel period, an offset of 2000 LSBs is included in the pixel data. However, only an offset of 200 LSBs is included in the pixel data according to the above-described operation of the processing unit 31, so that it is possible to reduce the included offset to 1/10.

This specific example exemplifies the example where the operation by the operation unit 312 and the determination by the noise determination unit 313 are performed at a time interval of 200 ns. However, by, for example, further shortening this time interval to 20 ns or 10 ns, it is possible to further reduce the offset included in the pixel data to be generated. However, this time interval needs to satisfy following two conditions. The first condition is a condition that the time interval includes one or more periods of short period noise. If this condition is not satisfied, it is concerned that the short period noise cannot be sufficiently reduced by the operation by the operation unit 312. The second condition is a condition that the time interval includes 50% or more of the signal of the photon pulse. If this condition is not satisfied, it is concerned that the determination by the noise determination unit 313 cannot be correctly performed. If these two conditions are satisfied, a shorter time interval is more effective to further reduce long period noise and a drift.

Figure 4:
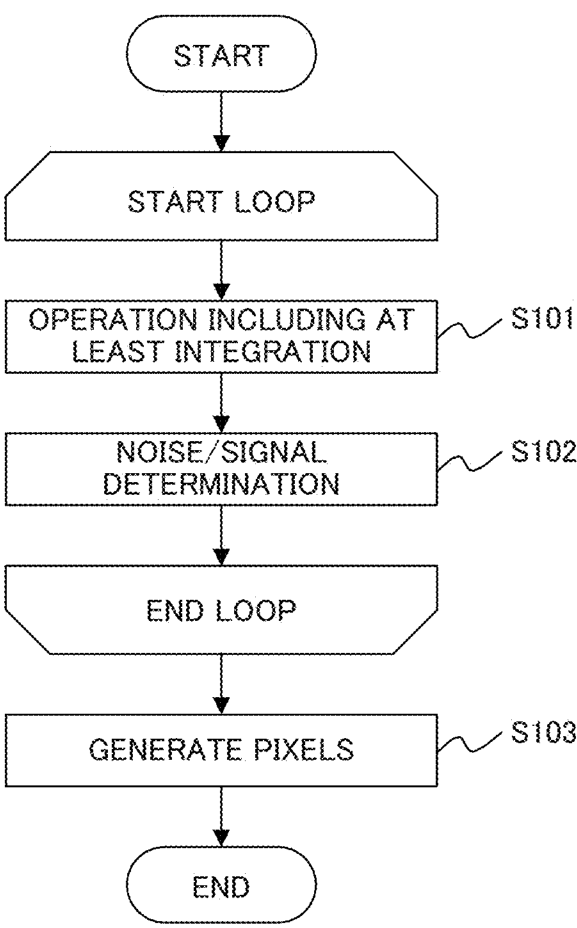
FIG. 4 is a flowchart illustrating the operation of the processing unit according to the first embodiment.

FIG. 4 is a flowchart illustrating an operation of the processing unit according to the first embodiment. Here, operations performed in one pixel period by the operation unit 312, the noise determination unit 313, and the pixel generation unit 314 in the processing unit 31 will be exemplified.

According to the operation illustrated in FIG. 4, operations in step S101 and step S102 are repeated N times at a time interval T. The time interval T is a time interval per period obtained by equally dividing one pixel period into N periods. In step S101, the operation unit 312 performs an operation including at least integration on the plurality of items of sampling data sampled by the A/D conversion circuit 311 during the time interval T. Details of the operation by the operation unit 312 are as described above. In step S102, the noise determination unit 313 determines whether an operation result computed in step S101 is noise or a signal. Details of determination by the noise determination unit 313 are as described above.

In step S103, the pixel generation unit 314 generates pixel data on the basis of the operation result in step S101 and a determination result in step S102 at each time interval T. Details of generation by the pixel generation unit 314 are as described above.

When the operation illustrated in FIG. 4 is repeated per pixel period to generate each pixel data, the control device 30 generates image data of the sample S based on each generated pixel data and a scanning position of the laser light on the sample S corresponding to each pixel data. Furthermore, for example, the PC 40 causes the monitor 50 to display an image related to the generated image data of the sample S.

As described above, according to the first embodiment, it is possible to reduce not only short period noise, but also long period noise and a drift among the noise included in the output signal of the photodetector 25. As a result, it is possible to obtain an image with a high S/N as an image related to the generated image data of the sample S. Furthermore, the drift fluctuates depending on an environmental temperature, a warming-up state of the photodetector 25, and the like, so that it is possible to achieve performance of the photodetector 25 having high stability against an environment and the like by reducing the drift.

Second Embodiment

The second embodiment is an embodiment where integration by an operation unit 312 performed in the first embodiment is performed by an analog circuit.

The second embodiment differs from the first embodiment in a configuration of a processing unit 31. Hence, the configuration of the processing unit 31 will be mainly described in description of the second embodiment. Note that the same elements as those of the first embodiment will be assigned the same reference numerals, and the detailed description thereof will be omitted in the description of the second embodiment.

Figure 5:
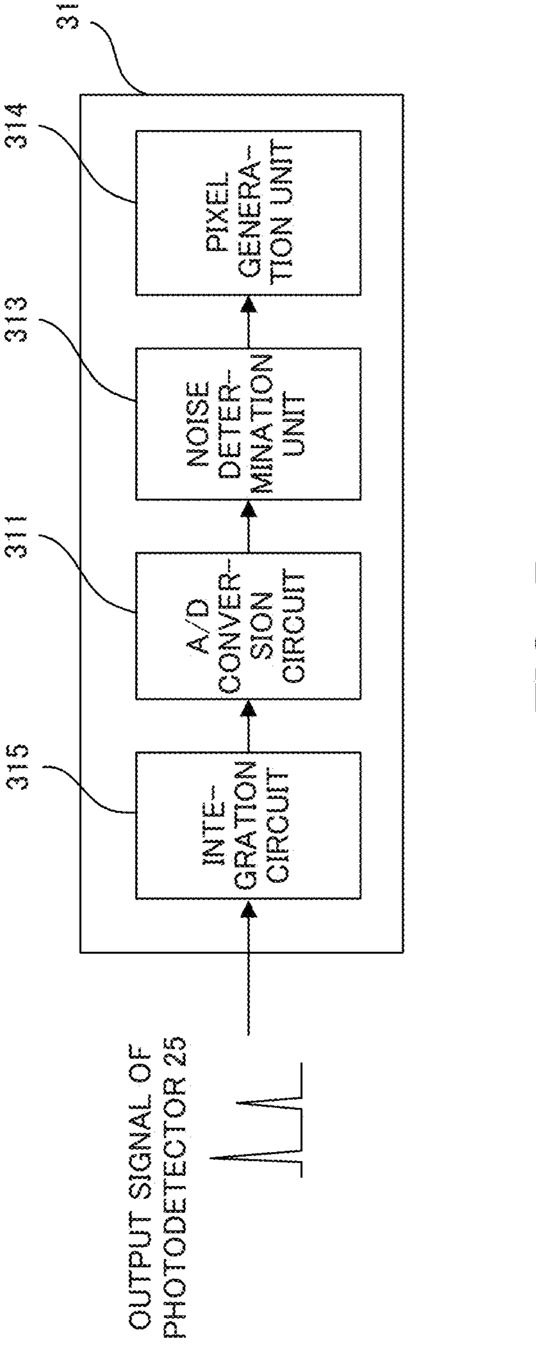
FIG. 5 is a diagram illustrating a configuration of a processing unit according to a second embodiment.

FIG. 5 is a diagram illustrating the configuration of the processing unit according to the second embodiment.

The processing unit 31 illustrated in FIG. 5 includes an integration circuit 315, an A/D conversion circuit 311, a noise determination unit 313, and a pixel generation unit 314.

The integration circuit 315 integrates an output signal (analog electrical signal) of the photodetector 25. The A/D conversion circuit 311 samples the output signal of the integration circuit 315. The noise determination unit 313 determines whether the sampling data sampled by the A/D conversion circuit 311 is noise or a signal. According to this determination, for example, the noise determination unit 313 determines the sampling data as noise when the sampling data is less than the threshold, and as a signal when the sampling data is the threshold or more.

Such integration by the integration circuit 315, the sampling by the A/D conversion circuit 311, and the determination by the noise determination unit 313 are performed at time intervals shorter than one pixel period. The time interval shorter than one pixel period desirably satisfies at least the above two conditions and is a shorter time interval similarly to the first embodiment.

The pixel generation unit 314 generates pixel data on the basis of the sampling data sampled by the A/D conversion circuit 311 and the determination result of the noise determination unit 313. More specifically, the pixel generation unit 314 generates pixel data of one pixel on the basis of each sampling data and each determination result of the noise determination unit 313 in one pixel period. At this time, the pixel generation unit 314 invalidates the sampling data determined as noise by the noise determination unit 313, validates the sampling data determined as the signal by the noise determination unit 313, integrates only the validated sampling data, and thereby generates the pixel data. Note that invalidating the sampling data also means handling the sampling data as 0. Alternatively, the pixel generation unit 314 may generate pixel data by integrating results obtained by subtracting a value based on a tendency of the invalidated sampling data from each validated sampling data. The value based on the tendency of the invalidated sampling data is, for example, an average value of the invalidated sampling data in one pixel period.

According to such a configuration of the processing unit 31, the integration circuit 315 can reduce short period noise among noise included in the output signal of a photodetector 25, and the noise determination unit 313 and the pixel generation unit 314 can reduce the long period noise and the drift among noise included in the output signal of a photodetector 25.

Figure 6:
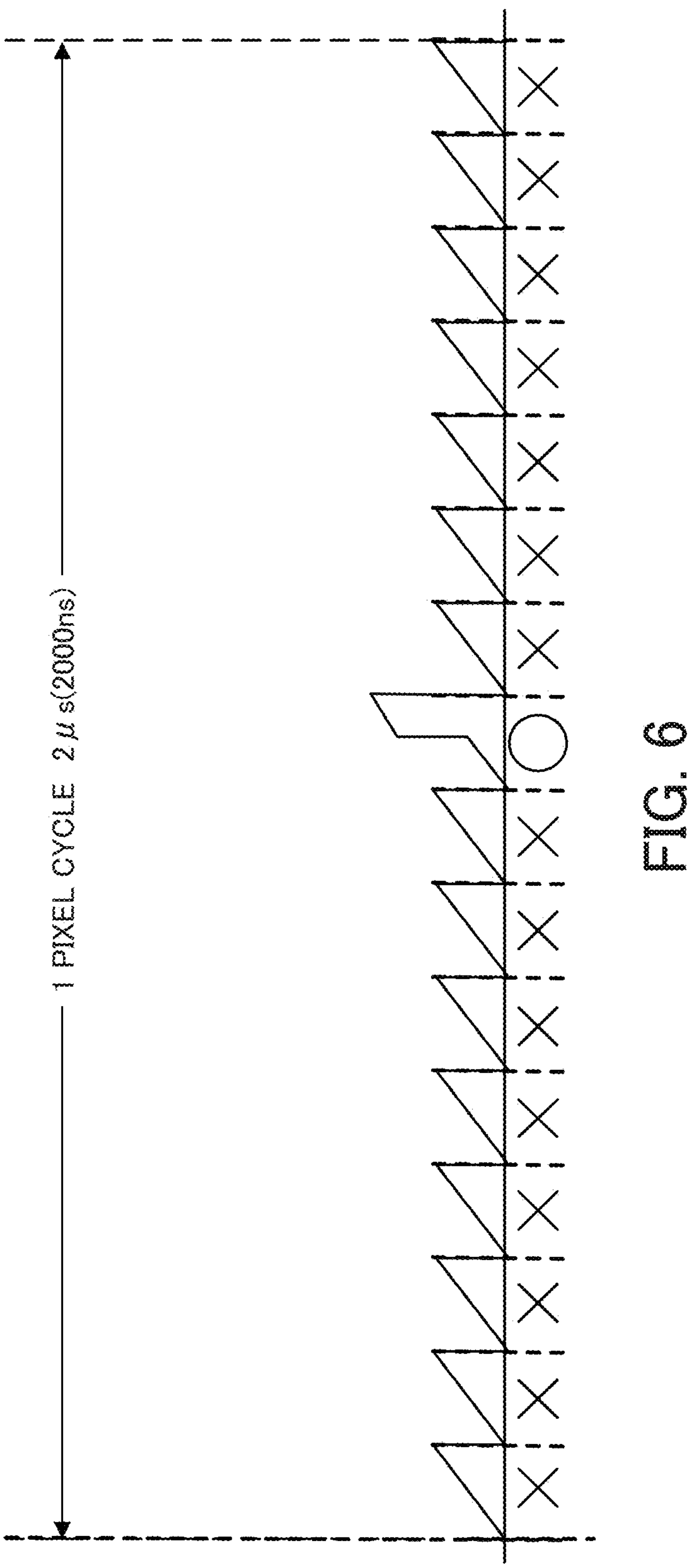
FIG. 6 is a view for describing a specific example of the operation of the processing unit according to the second embodiment.

FIG. 6 is a diagram for describing a specific example of the operation of the processing unit according to the second embodiment.

This specific example assumes that the output signal of the integration circuit 315 illustrated in FIG. 6 is obtained in one pixel period. One pixel period is two μs (2000 ns). It is assumed that the integration by the integration circuit 315, the sampling by the A/D conversion circuit 311, and the determination by the noise determination unit 313 are performed at time intervals (intervals of 125 ns) per one period obtained by equally dividing one pixel period into 16 periods.

In this case, in each period in one pixel period, the noise determination unit 313 determines the sampling data as noise (see "x" in FIG. 6) when the sampling data integrated by the integration circuit 315 and sampled by the A/D conversion circuit 311 in this period is less than the threshold, and determines the sampling data as a signal (see "○" in FIG. 6) when the sampling data is the threshold or more.

Furthermore, the pixel generation unit 314 invalidates the sampling data determined as the noise, validates the sampling data determined as the signal, integrates only the validated sampling data, and generates pixel data. In this specific example, since only one sampling data is validated, pixel data having the value of this sampling data is generated.

Alternatively, the pixel generation unit 314 may generate the pixel data by integrating results obtained by subtracting a value based on the tendency of the invalidated sampling data from each validated sampling data. In this specific example, since only one sampling data is validated, pixel data that is a result obtained by subtracting a value based on the tendency of the invalidated sampling data from this sampling data is generated. In a case where the value based on the tendency of the invalidated sampling data is, for example, an average value of the invalidated sampling data in one pixel period, pixel data having a value that is a result obtained by subtracting this average value from the validated sampling data is generated.

According to such an operation of the processing unit 31, the pixel data can be generated using only sampling data in a period in which there is a signal of a photon pulse, so that it is possible to reduce an offset included in the pixel data to be generated. Compared to, for example, a case where sampling data obtained by integrating the output signals of the photodetector 25 over one pixel period and sampling an integration result of the output signals is the pixel data, the offset included in the pixel data can be substantially reduced.

As described above, according to the second embodiment, even in a case where the integration by the operation unit 312 performed in the first embodiment is performed by an analog circuit, it is possible to obtain the same effect as that of the first embodiment.

Note that, in the second embodiment, in a case where it is concerned that a necessary integration time cannot be secured due to a turn-off time of the integration circuit 315, the integration circuits 315 may be provided in parallel, switched and used.

Third Embodiment

The third embodiment is an embodiment that is carried out when it is assumed that where a resonant scanner is used as a scanner 13, for example, and one pixel period becomes shorter.

The third embodiment differs from the first embodiment in an operation of a processing unit 31. More specifically, the processing unit 31 according to the third embodiment does not perform an operation by an operation unit 312 and determination by a noise determination unit 313 at a time interval shorter than one pixel period, but performs an operation and determination at the same time interval as the one pixel period. However, the one pixel period in this case is also a time interval that satisfies the above two conditions. When the one pixel period becomes shorter, a signal of a photon pulse becomes greater than an offset, so that, even when the operation by the operation unit 312 and the determination by the noise determination unit 313 are performed at the same time interval as the one pixel period, it is possible to obtain the same effect as that of the first embodiment.

Furthermore, accordingly, a pixel generation unit 314 invalidates an operation result of the operation unit 312 determined as noise by the noise determination unit 313, and sets the generated pixel data to 0. On the other hand, the pixel generation unit 314 validates the operation result of the operation unit 312 determined as a signal by the noise determination unit 313, and sets the generated pixel data as the validated operation result of the operation unit 312. Alternatively, a result obtained by subtracting a value based on a tendency of the invalidated operation result of the operation unit 312 from the validated operation result of the operation unit 312 may be pixel data to be generated. The value based on the tendency of the invalidated operation result of the operation unit 312 is, for example, an average value of invalidated operation results of the operation unit 312 in a plurality of latest pixel periods.

Figure 7:
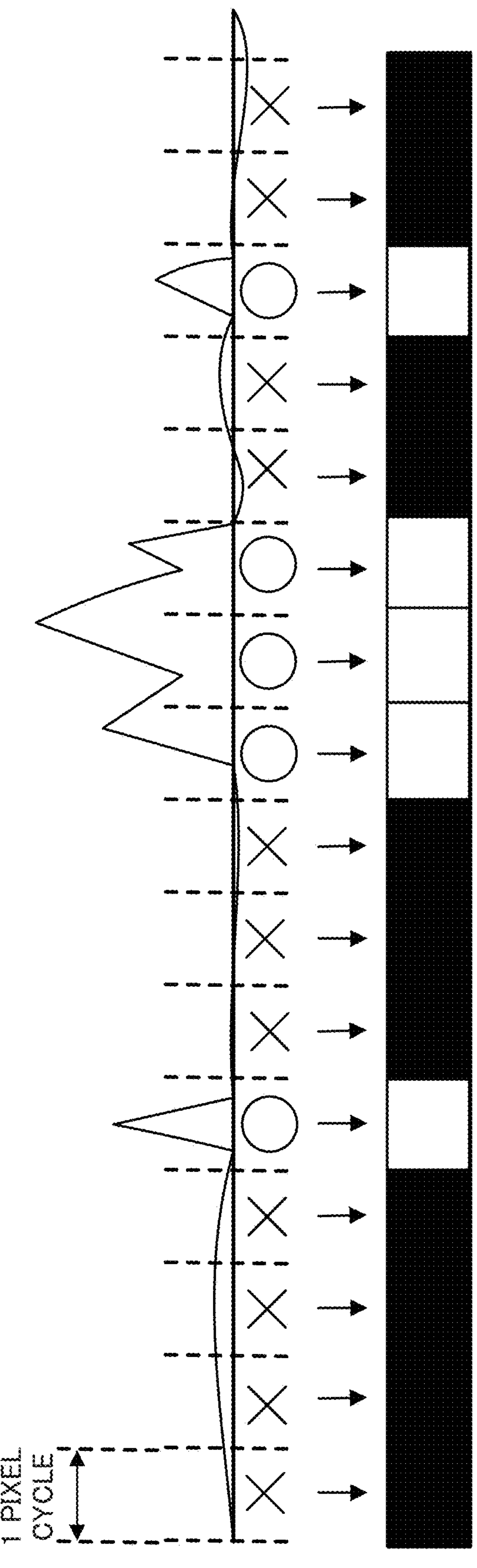
FIG. 7 is a view for describing a specific example of an operation of the processing unit according to a third embodiment.

FIG. 7 is a view for describing a specific example of the operation of the processing unit according to the third embodiment.

This specific example assumes that an output signal of a photodetector 25 illustrated in an upper side of FIG. 7 can be obtained.

In this case, the operation result of the operation unit 312 in one pixel period in which there is no signal of a photon pulse is less than the threshold, and the noise determination unit 313 determines the operation result as noise (see "x" on the upper side of FIG. 7). On the other hand, the operation result of the operation unit 312 in one pixel period in which there is the signal of the photon pulse is the threshold or more, and the noise determination unit 313 determines the operation result as a signal (see "○" on the upper side of FIG. 7).

Furthermore, the pixel generation unit 314 invalidates the operation result of the operation unit 312 determined as the noise, and obtains the generated pixel data that is 0. On the other hand, the pixel generation unit 314 validates the operation result of the operation unit 312 determined as the signal, and obtains the pixel data to be generated as the validated operation result of the operation unit 312. Alternatively, the pixel generation unit 314 may obtain as the pixel data to be generated a result obtained by subtracting a value based on a tendency of the invalidated operation results of the operation unit 312 from the validated operation result of the operation unit 312.

On a lower side of FIG. 7, pixels related to the pixel data of the operation result of the operation unit 312 determined as the noise and invalidated are illustrated in black, and pixels related to the pixel data of the operation result of the operation unit 312 determined as the signal and validated are illustrated in white.

As described above, according to the third embodiment, it is possible to obtain the same effect as that of the first embodiment in a case where one pixel period is short. Furthermore, it is possible to eliminate blur of an entire image due to long period noise in the image related to image data generated from each generated pixel data, and it is possible to eliminate luminance unevenness and the like of the image related to the generated image data of a plurality of frames. Furthermore, even in a case where long-time time-lapse or the like is executed, the processing unit 31 can reduce the long period noise and the drift, so that it is possible to reduce influences of the long period noise and the drift in measurement data based on the obtained image data.

The first to third embodiments have been described above. However, a control device 30 (except an A/D conversion circuit 311 in this case) according to the first and third embodiments may be implemented as a computer illustrated in FIG. 8. Furthermore, the control device 30 (except an integration circuit 315 and the A/D conversion circuit 311 in this case) according to the second embodiment may also be implemented as the computer illustrated in FIG. 8.

Figure 8:
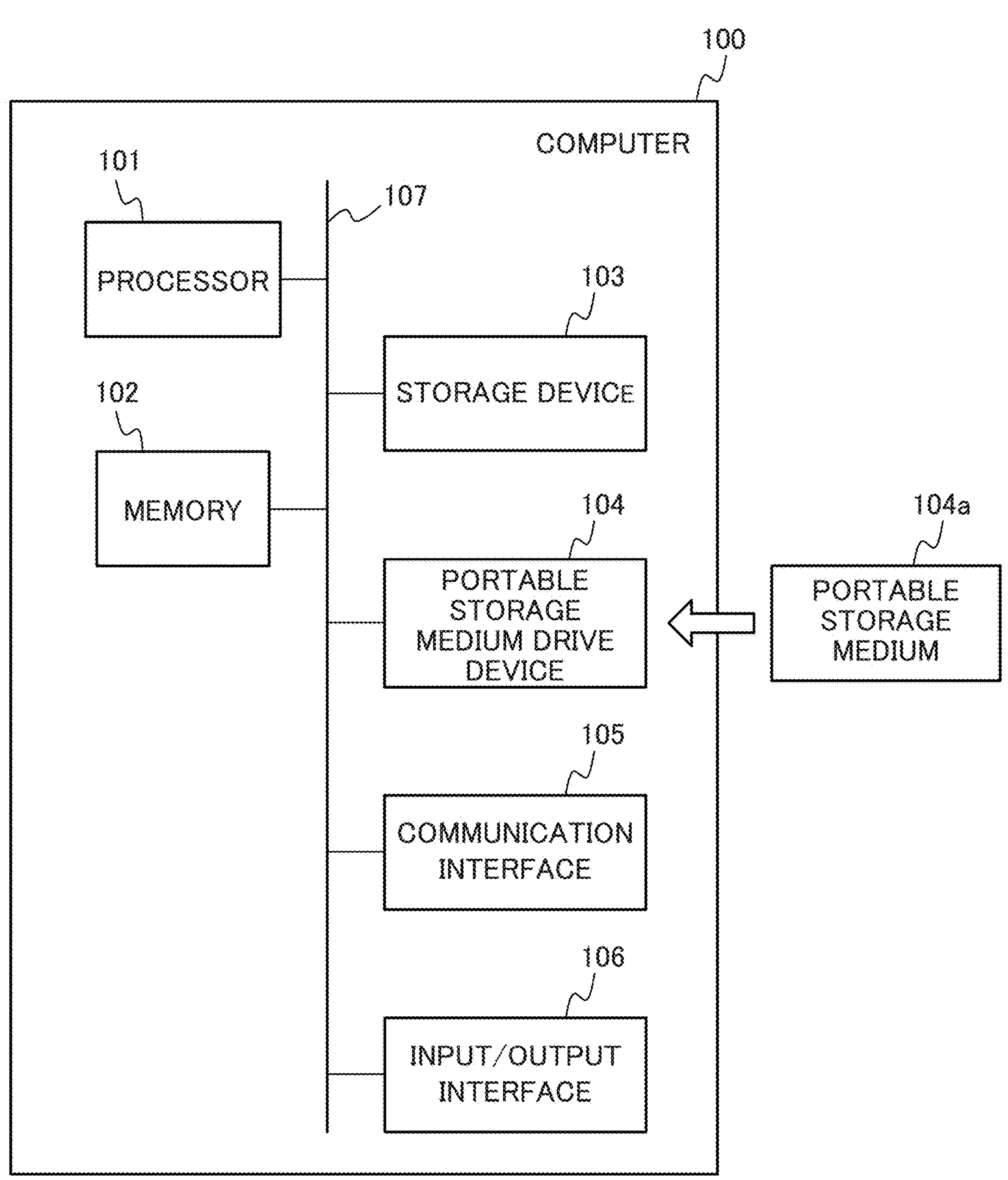
FIG. 8 is a diagram illustrating a hardware configuration of a computer.

FIG. 8 is a diagram illustrating a hardware configuration of a computer 100.

The computer 100 illustrated in FIG. 8 includes a processor 101, a memory 102, a storage device 103, a portable storage medium drive device 104, a communication interface 105, and an input/output interface 106, and these devices are connected to a bus 107 and can transmit and receive data to each other.

The processor 101 may be, for example, a single processor, a multiprocessor, or a multi-core processor. The processor 101 performs various types of processing (e.g., processing related to the operation illustrated in FIG. 4) by executing a program such as an Operating System (OS) and an application.

The memory 102 includes a Random Access Memory (RAM) and a Read Only Memory (ROM). Part of the program or the like executed by the processor 101 is temporarily stored in the RAM. Furthermore, the RAM is also used as a working storage area of the processor 101. The ROM stores the program to be executed by the processor 101 and various types of data necessary for executing the program.

The storage device 103 is a device that stores data, and is a Hard Disk Drive (HDD), a Solid State Drive (SSD), or the like.

The portable storage medium drive device 104 drives a portable storage medium 104*a*, accesses the contents stored therein, and reads and writes data. Examples of the portable storage medium 104*a* include a memory device, a flexible disk, an optical disk, and a magneto-optical disk. Other examples of the portable storage medium 104*a* include a Compact Disc Read Only Memory (CD-ROM), a Digital Versatile Disc (DVD), a Blu-ray disc, a Universal Serial Bus (USB) memory, and an SD card memory.

The communication interface 105 is connected to a network in a wired or wireless manner and communicates with an external device connected to the network.

The input/output interface 106 is connected to the external device and receives an input of/outputs data from/to the external device. Examples of the external device connected to the input/output interface 106 include a laser light source device 10, a microscope body 20, the A/D conversion circuit 311 connected to the photodetector 25 (or the A/D conversion circuit 311 connected to the photodetector 25 via the integration circuit 315), and a PC 40, and may be further connected with an input device and an output device. The input device is a keyboard, a mouse, a joystick, a touch panel, or the like, and the output device is a liquid crystal display or the like.

In this computer 100, the program executed by the processor 101 and various types of data necessary for executing the program may be stored not only in the memory 102, but also in the storage device 103 or the portable storage medium 104*a*. Furthermore, the program executed by the processor 101 and various types of data necessary for executing the program may be stored in the storage device 103 or the portable storage medium 104*a* via the communication interface 105 from the external device connected to the network.

Furthermore, the computer 100 is not limited to the computer illustrated in FIG. 8, and may include a plurality of part of components illustrated in FIG. 8 or do not include part of the components illustrated in FIG. 8.

Furthermore, the computer 100 may also include hardware such as a microprocessor, a DSP, an Application Specific Integrated Circuit (ASIC), a Programmable Logic Device (PLD), and a Field-Programmable Gate Array (FPGA). For example, the processor 101 may be implemented using at least one of these hardware.

In a case where the control device 30 (except the A/D conversion circuit 311 or the integration circuit 315 and the A/D conversion circuit 311) is implemented as the computer 100 illustrated in FIG. 8, the functions of the operation unit 312, the noise determination unit 313, and the pixel generation unit 314 are implemented by the processor 101.

Although the embodiments of the present invention have been described above, the present invention is not limited to the above-described embodiments, and various improvement and changes can be made without departing from the gist of the present invention.

What is claimed is:

1. A scanning microscope comprising:

a photodetector that detects light from a sample;

a sampling circuit that samples an output signal of the photodetector; and a hardware processor that:

performs an operation including at least integration on a plurality of items of sampling data sampled by the sampling circuit, determines whether a result of the operation is noise or a signal, and generates pixel data based on a result of the operation and a result of the determination, wherein:

the processor determines the result of the operation as the noise when the result of the operation is less than a threshold, and determines the result of the operation as the signal when the result of the operation is the threshold or more, and the processor invalidates the result of the operation determined as the noise, validates the result of the operation determined as the signal, and generates the pixel data.

2. The scanning microscope according to claim 1, wherein the processor subtracts a value based on a tendency of the invalidated result of the operation from the validated result of the operation, and generates the pixel data.

3. The scanning microscope according to claim 1, wherein the operation and the determination are performed at a time interval shorter than a pixel period.

4. The scanning microscope according to claim 2, wherein the operation and the determination are performed at a time interval shorter than a pixel period.

5. The scanning microscope according to claim 1, wherein the operation and the determination are performed at a time interval including one or more periods of short period noise.

6. The scanning microscope according to claim 5, wherein the operation and the determination are performed at a time interval including 50% or more of a signal of a photon pulse.

7. The scanning microscope according to claim 5, wherein the short period noise is a period of white noise or switching noise.

8. The scanning microscope according to claim 6, wherein the operation and the determination are performed at a time interval shorter than a pixel period.

9. The scanning microscope according to claim 1, wherein the photodetector includes a photoelectric conversion element, and the photoelectric conversion element is an Avalanche Photo Diode (APD) array or a Photo Multiplier Tube (PMT).

10. A pixel generation method for causing a computer to execute processing comprising:

performing an operation including at least integration on a plurality of items of sampling data obtained by sampling an output signal of a photodetector;

determining whether a result of the operation is noise or a signal; and generating pixel data based on a result of the operation and a result of the determination, wherein:

the determining determines the result of the operation as the noise when the result of the operation is less than a threshold, and determines the result of the operation as the signal when the result of the operation is the threshold or more, and the generating comprises invalidating the result of the operation determined as the noise, validating the result of the operation determined as the signal, and generating the pixel data.

11. A non-transitory computer-readable storage medium having stored thereon a program that is executable to cause a computer to execute processing comprising:

performing an operation including at least integration on a plurality of items of sampling data obtained by sampling an output signal of a photodetector;

determining whether a result of the operation is noise or a signal; and generating pixel data based on a result of the operation and a result of the determination, wherein:

the determining determines the result of the operation as the noise when the result of the operation is less than a threshold, and determines the result of the operation as the signal when the result of the operation is the threshold or more, and the generating comprises invalidating the result of the operation determined as the noise, validating the result of the operation determined as the signal, and generating the pixel data.

12. The scanning microscope according to claim 1, wherein the threshold is set so that the result of the operation in a period in which there is no signal of a photon pulse is less than the threshold.

13. The scanning microscope according to claim 1, wherein:

the operation and the determination are performed at a time interval shorter than one pixel period, which is a sampling time per pixel constituting an image of the sample, and the time interval is a time interval when the one pixel period is equally divided into a plurality of periods.

* * * * *